United States Patent

Gotz et al.

[11] Patent Number: 5,610,491
[45] Date of Patent: Mar. 11, 1997

[54] ELECTRICAL DRIVE SYSTEM FOR THE POSITIONING OF ROTATING EQUIPMENT

[75] Inventors: Fritz R. Gotz, Oberasbach; Heinrich Marz, Feucht; Harald Meis, Burgthann; Werner Agne, Rothenbach, all of Germany

[73] Assignee: Baumuller Nurnberg GmbH, Nurnberg, Germany

[21] Appl. No.: 307,871

[22] Filed: Sep. 16, 1994

[51] Int. Cl.$^6$ .......................... B41F 13/004; G05B 11/32
[52] U.S. Cl. ........................ 318/625; 318/572; 318/574; 318/602
[58] Field of Search .................................. 318/561, 569, 318/570, 571, 572, 574, 600, 601, 602, 605, 615, 625, 632; 101/141, 212, 213, 214, 216

[56] References Cited

U.S. PATENT DOCUMENTS

| | | | |
|---|---|---|---|
| 3,753,016 | 8/1973 | Klein | 310/90 |
| 4,034,276 | 7/1977 | Hyatt | 318/608 |
| 4,118,129 | 10/1978 | Grundherr. | |
| 4,271,379 | 6/1981 | Eckelmeyer | 318/77 |
| 4,315,198 | 2/1982 | Lin et al. . | |
| 4,429,267 | 1/1984 | Veale | 318/594 |
| 4,506,321 | 3/1985 | Comstock et al. | 318/561 X |
| 4,529,325 | 7/1985 | Moon | 318/601 X |
| 5,309,834 | 5/1994 | Koch | 101/248 |

FOREIGN PATENT DOCUMENTS

| | | |
|---|---|---|
| 2338150 | 2/1975 | Germany . |
| 3318250 | 11/1984 | Germany . |
| 3228507 | 2/1985 | Germany . |
| 3342662 | 6/1985 | Germany . |
| 3707866 | 10/1987 | Germany . |
| 0396924 | 11/1990 | Germany . |
| 4138479 | 6/1993 | Germany . |
| 4210988 | 10/1993 | Germany . |

*Primary Examiner*—Bentsu Ro
*Attorney, Agent, or Firm*—Wolf, Greenfield & Sacks, P.C.

[57] ABSTRACT

An electrical drive system for angular positioning of one or several rotating and/or tilting machine components and equipment components, particularly of printing machines, including at least one electric motor having a rotor designed for rigid and direct coupling to the component, further including by one or several angle encoders for registering the angular motion of the rotor of the electric motor and/or the component, a signal processing module which receives the actual angle position signals from the angle encoder or encoders and which also receives the setpoint data for comparison with the actual data, and a power amplifier controlled by the signal processor and used for driving the electric motor.

16 Claims, 5 Drawing Sheets

FIG. 8

ELECTRICAL DRIVE SYSTEM FOR THE POSITIONING OF ROTATING EQUIPMENT

The invention relates to an electrical drive system to position one or several rotating and/or tilting equipment components and machine components, particularly in regard to printing machines, comprising at least one electric motor with a rotor designed for rigid and direct coupling to the component. The invention also relates to the design of an angle encoder that is connected to a drive controller, and that consists of a rotating or tilting sensor rotor and a corresponding stationary scanner to determine the angular position of a pivoted, frame-mounted equipment component or machine component that can be positioned longitudinally, obliquely, transversely, and/or diagonally relative to its axis. The invention also relates to a printing machine, particularly an offset printing machine with direct drives.

Similar drive systems, drive designs and techniques, and printing machines are known from the patent application DE-OS 41 38 479 and the earlier European patent application 93 106 554.2. These references are hereby made a part of this disclosure. Shafts and gears are the general State-of-the-Art methods for coupling individual printing machine systems such as unwinds/roll changers, printing units, impression cylinders, dryers with cooling drums, folders, sheeters, layboys, etc., to achieve the relative angle positions. Modularization of these components and units without mechanical coupling devices requires individual direct drive systems for each of these components as described in DE-OS 41 38 479. The drive systems must be synchronized to achieve the required angle orientation for each printing machine component.

The invention solves the described tasks for an electrical drive system with the above described characteristics by using one or more angle encoders for registering the angular motion of the rotor of the electric motor and/or the machine component or equipment component, a signal processing module that receives the actual angle position signals from the angle encoder or encoders and that also receives the setpoint data for comparison with the actual data, and a power amplifier for driving the electric motor that is controlled by the signal processor.

The signal processing module is designed as a drive controller that can be configured for parameters, complex control algorithms and/or multiple control loops. The invention provides a concept for a multiple control system for multiple axes that can be modularized. The drive system according to the invention is particularly suited for the specific application of printing machines, especially offset printing machines, because it provides the high quality and accuracy for angle positioning that is required for printing units for example, where half-tone dots of different colors must be printed within a narrow tolerance.

An actual design of the drive system according to the invention may have the rotor of the electric motor mechanically integrated into the component such as an impression cylinder and/or may be designed as one piece. This may be done by connecting the rotor to a shaft end of the rotating component. Or it may be advantageous to design the electric motor of the drive system according to the invention with a drum-shaped or cylindrical external rotor. This will provide a design wherein the rotor shape approximates the functional axially symmetric shape of the component, and it may even provide a design wherein the rotor may be incorporated into the component.

Similar to the mentioned direct drive of the component, the invention also includes the direct measurement of its angular position, speed, acceleration, etc. Accordingly, a good design of the invention will have the angle encoder directly attached to the component to allow the direct measurement of the angular or rotational/tilting motion. Particularly, fast high definition angle encoders will commonly allow direct and extremely accurate monitoring of the control path that consists of the rotating or tilting components.

Another design incorporates an electric motor with a single angle encoder attached, that measures the angular motion of the rotor of the electric motor; at the same time, a sensor module is provided to measure component parameters, a common device in control engineering. This module is connected to the angle encoder and/or the signal processing module, preferably as a differential feedforward (a common practice in control engineering). The differential feedforward can also be used by the invention with at least two angle encoders, each one of them being attached to the rotor of the electric motor and to the component to measure directly their angular motion.

Applications of the invention will use fast angle encoder designs with maximum definition, for example sine/cosine absolute encoders, incremental encoders with square wave pulses and a marker pulse, and incremental encoders with sine/cosine signals and a marker pulse. For applications with axial positioning of the component, for example side registration positioning in printing machines, the angle encoders of the invention are especially designed as hollow shaft encoders with a pinion and a pick-up transducer. A gap between the pinion and the pick-up transducer prevents within limits any axial offset to impair the pick-up function of the transducer relative to the pinion. The advantage of the hollow shaft design is mainly that the pinion can be integrated into the component that needs to be monitored, and/or be designed as one piece to allow direct recording or registration of its angular motion.

It is best to use fast responding power amplifiers with digital phase current controllers in the drive system according to the invention. The voltage system converter may be designed using an intermediate voltage circuit or direct power supply with the resulting high intermediate circuit voltage (as commonly known in control engineering). The latter allows large current changes per time. It is useful to design the digital phase current controls of the drive system according to the invention with pulse width modulation with high clock frequency, fast transistorized switches, and anticipatory voltage controls, wherein the phase current setpoint data and/or anticipatory data are entered via interference-free fiberoptic lines. Feedback of the actual phase current data and/or voltages to the motor controller as well as the input of configuration data and system parameters, and feedback of status data would be useful for diagnostic purposes.

It is recommended to utilize fast signal processing features for the drive system according to the invention to ensure fast dynamic control characteristics for the tilting or rotational motion of the component. They are best implemented by using a digital signal processor coupled with a separate peripheral module for the axes. Available signal processors for drive controllers allow to configure and set parameters and have realistic scanning times of about 100 sec (even for complex control algorithms and multiple control loops) as well as processing times of about 50 sec. The signal processor tasks can include sensor output analysis, motor control, speed control, angle position control, fine tuning of setpoint data and others. The peripheral module for the axes is best implemented using a fiberoptic interface to the digital phase current controller and to the angle encoders that are preferably designed as sine/cosine absolute encoders, incremental encoders with square wave pulses and a marker pulse, and incremental encoders with sine/cosine signal and a marker pulse.

This design of the signal processing module can be used according to the invention to operate the relevant rotating units or equipment components or machine components, particularly of a printing machine, by providing simultaneous setpoint data for the position control of this angle position oriented operation. The signal processor can generate the setpoint data for stepping, acceleration or speed while observing the limiting values. Particularly, an anticipatory control can be achieved for the angular positioning speed, acceleration and for stepping.

Rotating components that rub each other represent rotating masses coupled via friction slip. Bare cylinder wall segments of printing machine cylinders that are in friction contact and under pressure are called Schmitz rings. The problem of rotating masses coupled via friction slip is addressed in the invention by a special design feature wherein the signal processor module employs several controllers or series of controllers each assigned to a single component that are coupled via additional weighted feedback. It is useful to implement cross-coupling.

The rotating impression cylinder of "printing machine" applications exhibits a known disturbance variable that originates from the longitudinal groove on the cylinder used for a rubber cloth or a printing plate. The groove on the cylinder surface leads to an alternating normal load and thereby to an alternating torque. This phenomenon can be best compensated in the drive system according to the invention by evaluating the actual values using characteristic line elements and disturbance variable feedforward.

Concerning the initially described issues, an underlying issue of the invention is to establish a monitoring structure and methodology that allows accurate measurement and reproduction of the rotating or tilting behavior of the component without losses. A rigid connection between the driven angle encoder and the measured rotating mass is imperative. The proposed solution consists of a direct rigid and inflexible connection between the sensing rotor of a typical angle encoder and the component, and the attachment of the scanner to the frame, wherein the tracking device of the scanner is designed and arranged in such a way that it follows the adjustments of the component with the attached sensor rotor. This allows to compensate easily for larger component adjustments in cases where the gap between the scanner and the sensor rotor can not be adequately sized. The tracking device of the invention actuates the scanner of the angle encoder such that the scanner follows the adjustments of the component at least as long as they exceed the gap size between the scanner and the sensor rotor. The tracking device can include several components: a linear guide in the direction of the axis of the sensor rotor that may accommodate also the motor/component unit to allow scanner adjustment in line with the side registration positioning of the cylinder component for the "printing machine" application; an eccentric guide that positions in the radial direction relative to the above mentioned axis, to allow scanner adjustment in line with printing cylinder settings or diagonal registration positioning for the "printing machine" application that are commonly set by eccentric adjustment of the cylinder/motor shaft. It appears necessary that the guides for the component/sensor rotor on one hand and the scanner/eccentric guide on the other hand are of the same design; particularly that they are congruent to ensure tracking of the scanner and the component/sensor rotor in identical eccentric paths. The accuracy of the tracking can be further increased by coupling and/or synchronizing both eccentric guides with a common preferably mechanical member that can be disconnected.

A further design feature of the invention provides a locking device that is attached to or synchronized with the tracker, that allows to lock the scanner to the frame after completion of the tracking steps. The purpose of this feature is to obtain a stationary rigid attachment of the scanner to the machine body, especially a printing machine frame.

It is useful to provide one or several separate adjusting devices for the axial linear adjustment or the eccentric adjustment of the stator that correspond to the adjustments of the component/sensor rotor: for example a rotating drive that is connected to an eccentric bushing that holds the scanner or linear drive that is connected to the axially shifting scanner, to allow tracking of the scanner with the aim of maintaining an acceptable gap between the scanner and the sensor rotor. The accuracy of these tracking motions can be further improved by coupling and/or synchronizing the mentioned rotating or linear drives that are associated with scanner on the one hand and the rotating-mass/sensor-rotor-unit on the other, for the purpose of registration positioning or setting (application: printing machine).

Concerning the initially described issues, an underlying issue of the invention concerning printing machines is to monitor reliably the rotating and tilting components and to feed the associated parameters to a drive controller. Any mutation of the measured data must be possibly avoided, that is the coupling of the driven cylinders and the measuring device must be possibly without losses by providing maximum possible rigidity in the direction of the force and torque transmission. The invention proposes to solve this for a typical printing machine by providing each cylinder with an angle encoder that is directly attached and that measures the angle positions directly and feeds them to the drive system. The angle encoder represents thereby a direct monitor for the component within a drive control sequence or a drive control loop that is used especially for the setting the circumferential registration. Direct monitoring allows to establish a low inertia and mechanically rigid measuring string without play for each of the components, that is each cylinder or printing drum. The result of this is a very accurate control with very good dynamic characteristics that allow exact web guiding, constant web tension and uniform coloring, made possible by the extremely precise registration control and printing settings. The applicable rotating masses (for example plate cylinders and rubber cloth cylinders of a printing station) are directly registered according to the invention without intermediate elastic, damping or friction links thereby allowing processing of the actual motion characteristics of the monitored component of the printing machine by the control system without elasticity, yielding or play. It is useful for this purpose to lock the scanner of the angle encoder rigidly and without play to a stationary wall such as the frame of the printing machine.

Along with these ideas arises the necessity to allow eccentric positioning of the sensor rotor that is for example rigidly and tightly connected to the printing cylinder to allow set-printing retract-printing movements as well as diagonal registration adjustments. This is solved by the invention by arranging the sensor rotor and the scanner of the angle encoder with such a gap and/or make the gap adjustable in such a way that the gap between them can change sufficiently to accommodate the corresponding eccentric adjustments.

This allows to accommodate adjustments of the rigidly coupled rotating mass(component)/sensor rotor, although the scanner is locked to the stationary frame. The normally existing gap between the scanner and the sensor rotor is used for this purpose. This design feature of the invention is implemented by using a hollow shaft sensor. Its sensor rotor is designed as a sensor pinion that is facing the scanner without any mechanical connection to the scanner such as a bearing or similar.

Other features, details, and advantages of the invention are established in the subclaims and the following description of preferred examples of embodiment of the invention. They are illustrated in the drawings, wherein:

Figure 1:
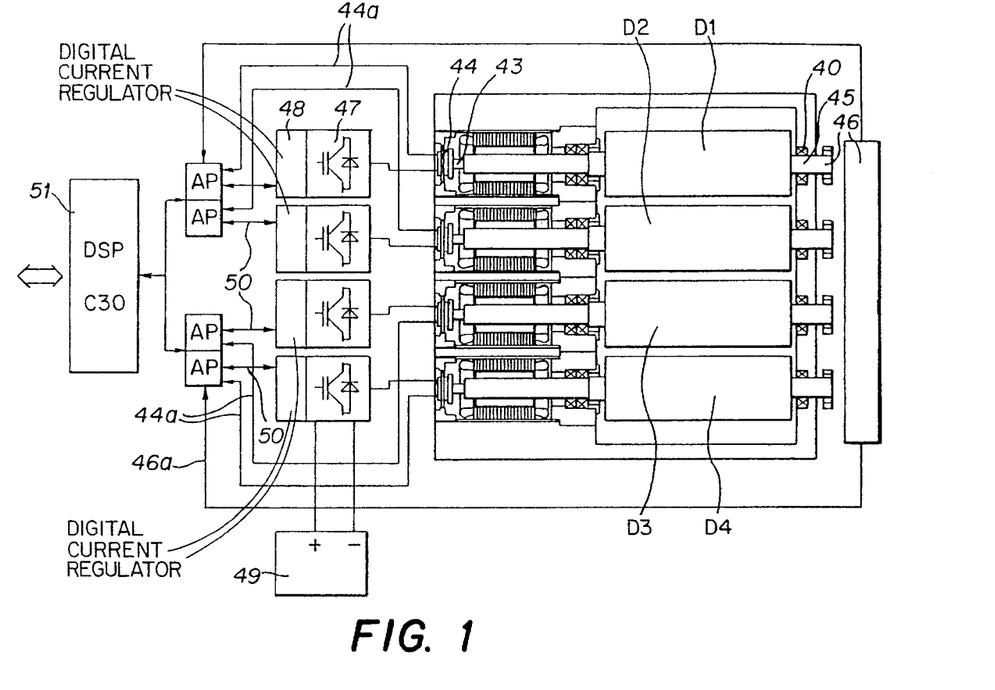
FIG. 1 illustrates a schematic layout of a direct drive system according to the invention, partially in a longitudinal view.

FIG. 1 shows the printing station of a rotary offset machine that consists of four plate or rubber cloth cylinders D1, D2, D3, and D4 (shown schematically) that rotate in the bearings 40 of the stationary frame H (see also FIG. 6) of the machine. Each of them is connected to an electric motor consisting of rotor assembly F and stator assembly G for their rotation. The shaft end 41 of the rotor F is coupled directly to the shaft end 42 of the cylinder D; in other words they are mechanically integrated to form a transition and drive connection that has the torsional strength of a one-piece steel shaft. The face of the free shaft ends 43 of the electric motors F,G are equipped with sine/cosine absolute angle encoders 44. The opposite shaft ends 45 of the cylinders D1–D4 are each equipped with a similar absolute angle encoder 46. The electric motors are designed as built-in motors. They may be designed as synchronous 3-phase motors with permanent magnets. They are operated by a power supply 47 that includes a digital current regulator 48. The power supply 47 is fed with electric power by an intermediate circuit supply 49. Each digital current regulator 48 is connected by an interference-free fiberoptic communication line 50 to a peripheral module of the axes AP. Each peripheral module of the axes has an interface 44a and 46a to the angle encoder 44 that is attached to an electric motor F,G and to the angle encoder 46 that is attached to the opposite shaft end 45 on the face of the cylinders D1–D4. The peripheral modules of the axes AP are controlled by a common digital signal processor 51. It is designed as drive controller that can be configured for a maximum number of axes with position controls, speed controls, motor control and sensor analysis.

Figure 3:
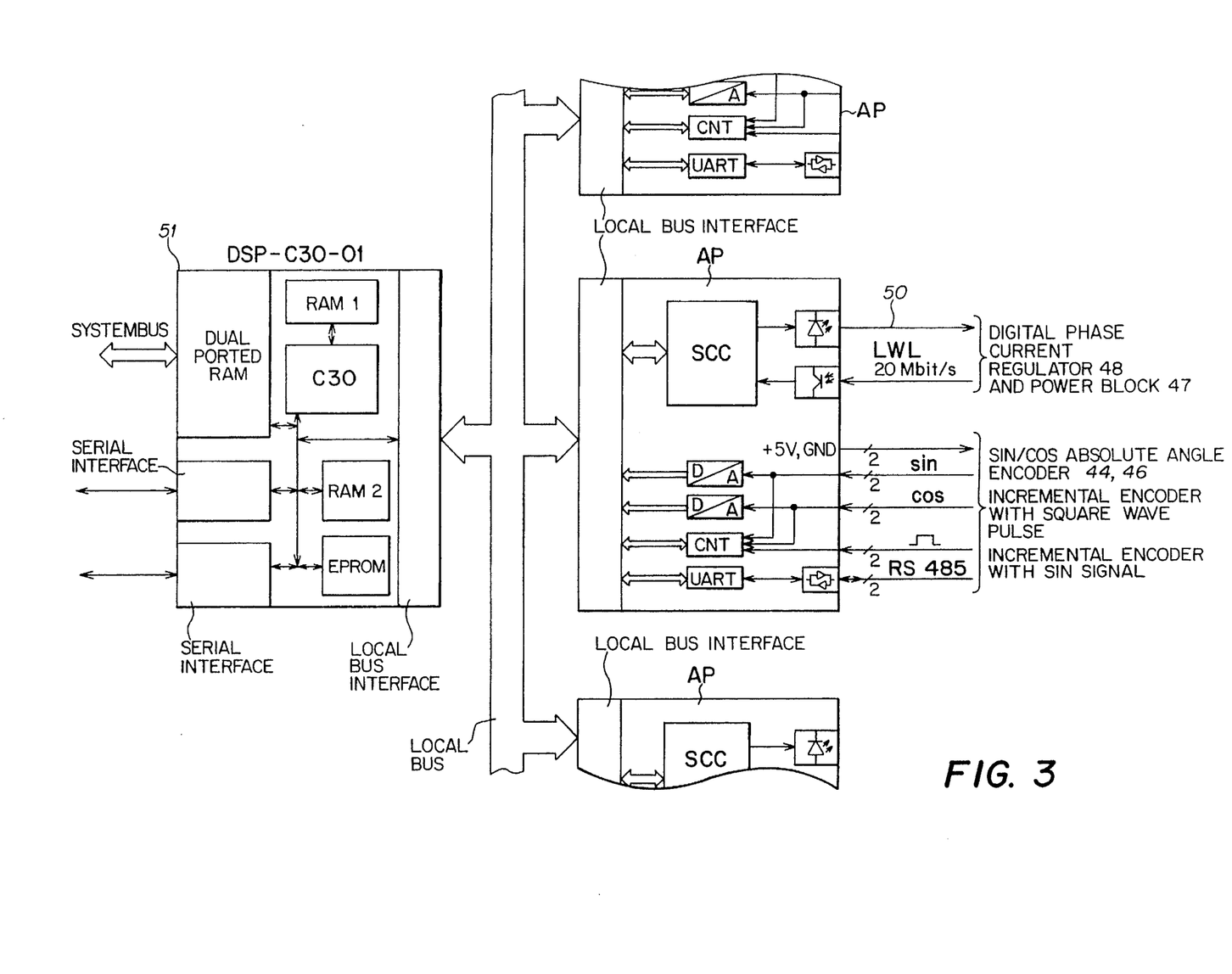
FIG. 3 shows a block diagram of a signal processing module of the direct drive according to the invention.

FIG. 3 shows the internal structure of the signal processor 51 and the enlarged peripheral modules for the axes AP and uses the standard abbreviations to make further explanations basically unnecessary. SCC depicts a so-called serial communication module.

Figure 2:
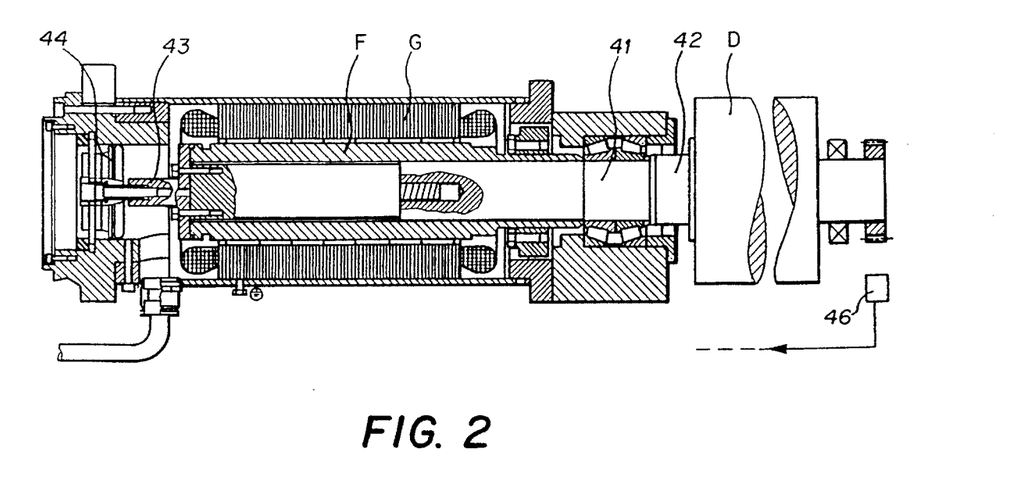
FIG. 2 shows a partial longitudinal section of a direct drive connected to a rotating cylinder.
Figure 4:
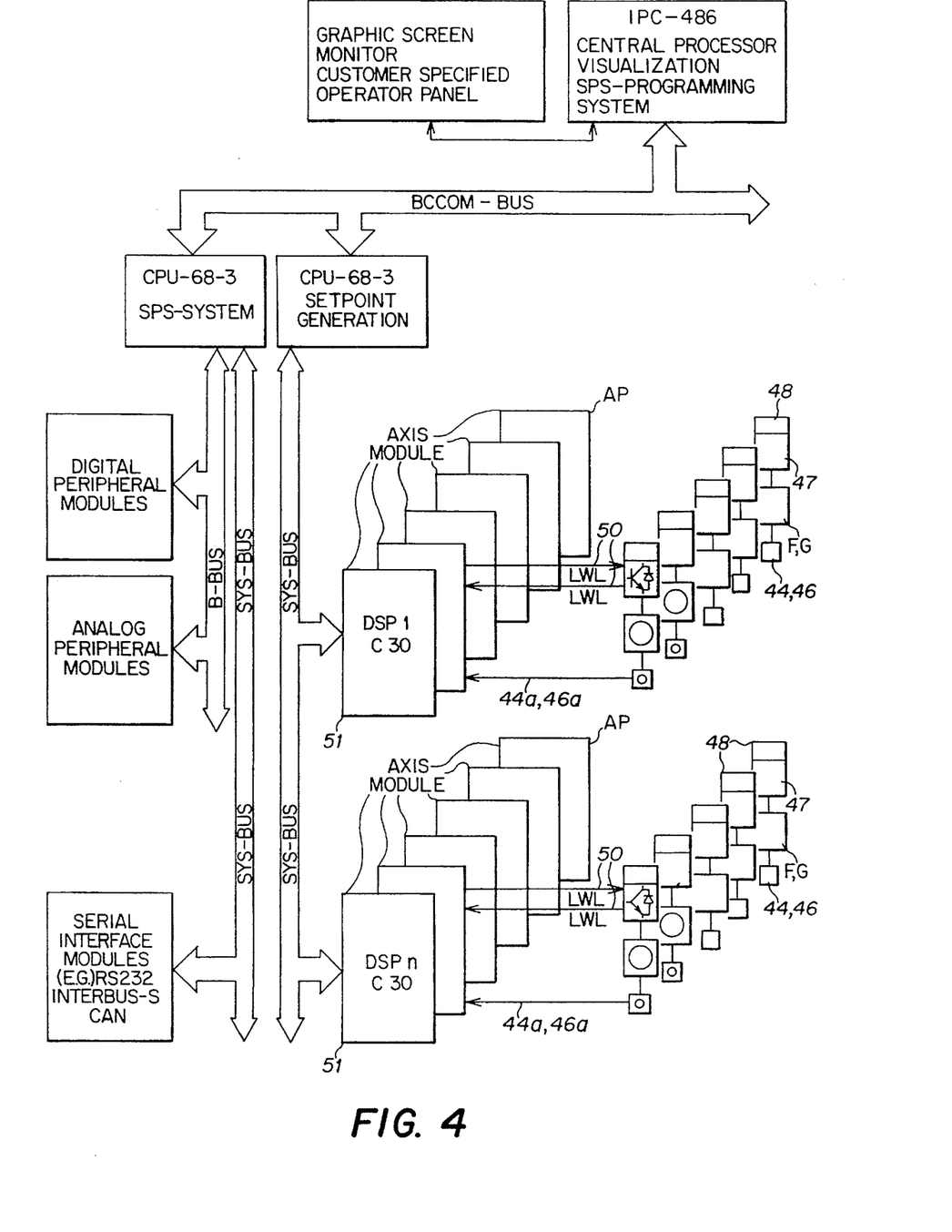
FIG. 4 shows a block diagram of a modular drive system of the invention for the control of multiple component axes.

FIG. 4 shows the tie-in of the invented drive system of FIG. 1–3 into a global concept for multiple controls with assignable modular control units. CPU-68-3 modules are used as programmable controllers and setpoint generators in addition to the IPC-486 central processor. They are connected to the signal processors via a system bus.

Figure 5:
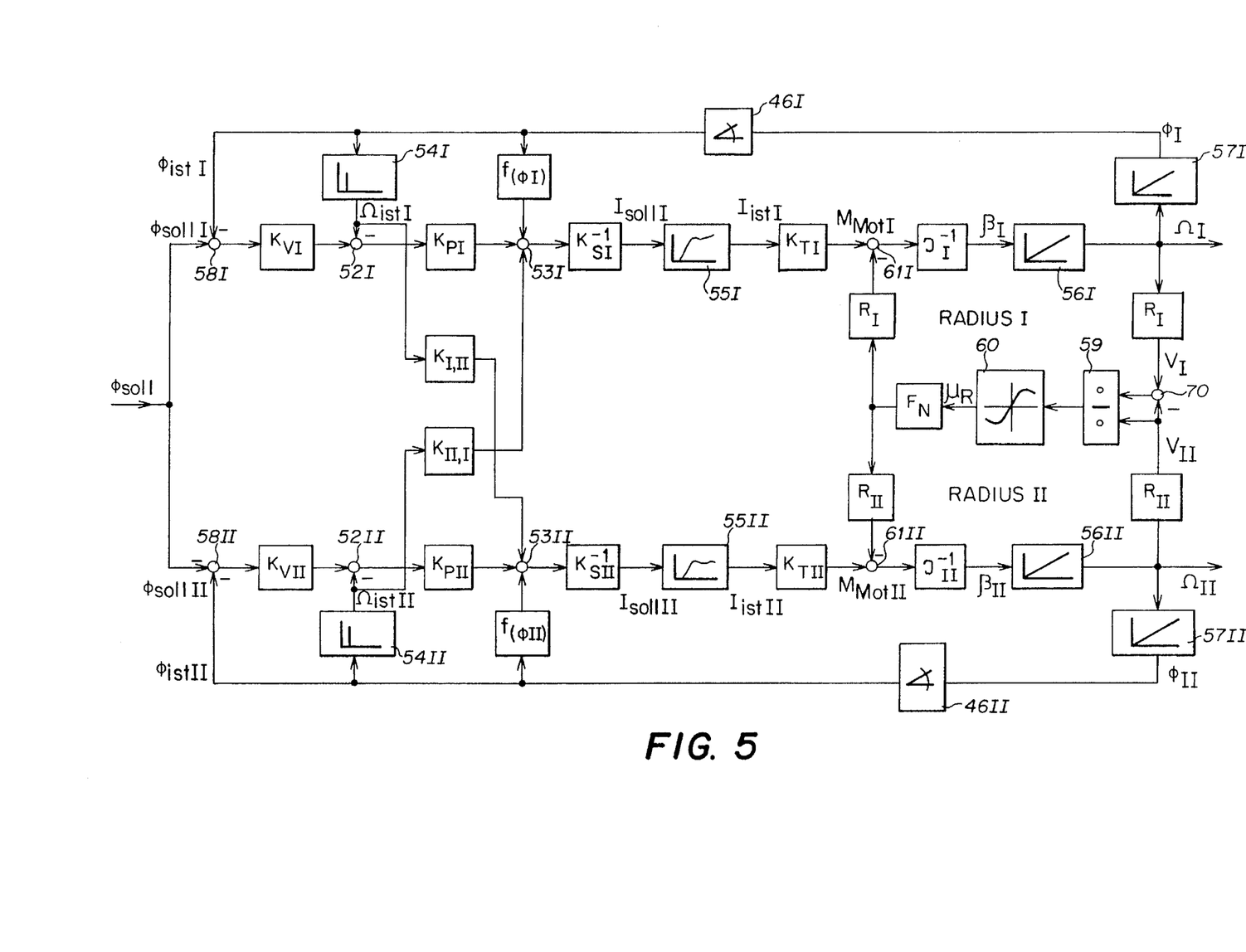
FIG. 5 shows a tree block diagram of the dynamic behavior of one exemplary embodiment of the invention.

FIG. 5 shows a block diagram of a typical drive system of the invention for two axes I and II that are position-controlled and coupled by slip friction (Schmitz rings). Setpoint generation (for example according to FIG. 4) will provide the angle setpoints $\phi_{soll\ I}$ and $\phi_{soll\ II}$ for each axis I and II. Comparison with the actual values $\phi_{ist\ I}$ and $\phi_{ist\ II}$ that were received from the angle encoders 46 will provide the corresponding control difference that is fed into a position controller $K_{VI}$, $K_{VII}$. Its output is used as input to a differential element 52I, 52II that receives also the derivative actual angular position or angular velocity $\Omega_{istI}$, $\Omega_{istII}$ of the axes I, II. The resulting differential value is fed into a speed controller $K_{pI}$, $K_{pII}$ and its output is fed in turn into a summation element 53I, 53II. Each summation element is fed also the output of the characteristic element $f(\phi_I)$, $f(\phi_{II})$ which is a function of the angular position I, II, in order to arrive at a disturbance variable feedforward. Correspondingly, the output of the respective angle encoder 46I, 46II connects to the input of the characteristics element. The summation elements 53I, 53II also receive the output of the proportional feedback elements $K_{I,II}$, $K_{II,I}$ that access crosswise the actual angular speeds $\Omega_{IstII}$ and $\Omega_{IstI}$ respectively, at the corresponding differential element 54II and 54I. The inputs to the differential elements 54I and 54II are connected to the corresponding angle encoder 46I, and 46II respectively. This crosswise coupling via the proportional elements $K_{I,II}$ and $K_{II,I}$ respectively, has a decoupling effect for example on the control sequences/axes I and II which are coupled for example by the Schmitz rings.

The respective outputs of the summation elements 53I and 53II feed directly into the corresponding proportional elements $K^{-1}{}_{SI}$, $K^{-1}{}_{SII}$ that represent the factors of the rotating masses of the components for the axes I and II. This is followed by the current control circuits 55I, 55II that convert the current setpoint input $I_{sollI}$, $I_{sollII}$ into actual current values $I_{istI}$, $I_{istII}$. The current control circuits 55I, 55II perform approximately like $PT_2$ elements that are common in control technology. The respective actual current values $I_{istI}$, $I_{istII}$ are fed to the proportional elements $K_{TI}$, $K_{TII}$ that represent the electric motor constants used for converting current into motor torque $M_{MotI}$, $M_{MotII}$. The link with the respective proportional element $I^{-1}{}_I$, $I^{-1}{}_{II}$ that corresponds to the respective rotating mass of axis I, II is immediately followed by the forward integration of the angular acceleration $\beta_I$, $\beta_{II}$ in the integration element 56I, 56II and results in the angular velocity $\Omega I$, $\Omega II$ of the rotating masses/components around their axes I, II. Further integration with the integration element 57I, 57II in connection with the respective angle encoders 46I, 46II results in the actual angle position $\phi_{istI}$, $\phi_{istII}$ that are fed to the comparators 58I, 58II at the start of the block diagram of FIG. 5 for the comparison of actual and setpoint values.

Further, the disturbance variable must be considered that results for example from the slip friction between cylinders D1, D2, and D3, D4 respectively, due to the plate/rubber cylinders in the printing station of a rotary offset machine (see FIG. 1). This is reflected in FIG. 5 at the end of the block diagram or drive tree by the identical, paired, parallel proportional elements $R_I$ (corresponding to the half diameter or radius of the rotating mass of axis I) on one hand and $R_{II}$ (corresponding to the half diameter or radius of the rotating mass of axis II) on the other hand. The respective circumferential speeds $v_I$, $v_{II}$ of the rotating masses I, II are calculated in the first or outer element of the proportional element pairs $R_I$, and $R_{II}$ respectively, that have the respective angular velocities $\Omega I$ and $\Omega II$ as input. The circumferential speeds $V_I$, $V_{II}$ are subtracted from each other at element 70. The slip s is calculated by dividing this difference by one of the circumferential speeds $V_I$, $V_{II}$ of the two rotating masses, as shown by the division element 59. The downstream element 60 represents the specific friction characteristics for the contacting cylinder surfaces and provides the friction coefficient $\mu_R$. Multiplication with the normal load $F_N$ that corresponds to the nip pressure of the cylinders results in the interfering friction force that is directed in the tangential or peripheral direction. Multiplication of this force with the corresponding second or inner proportional element $R_I$, and $R_{II}$ respectively, of the proportional element pairs for the radius results in the torque effect that turn in opposite direction compared to the motor torques $M_{MotI, and}$ $M_{MotII}$ respectively, due to the friction losses, as shown at the comparison elements 61I and 61II of the axes I and II.

Figures 6, 7, 8:
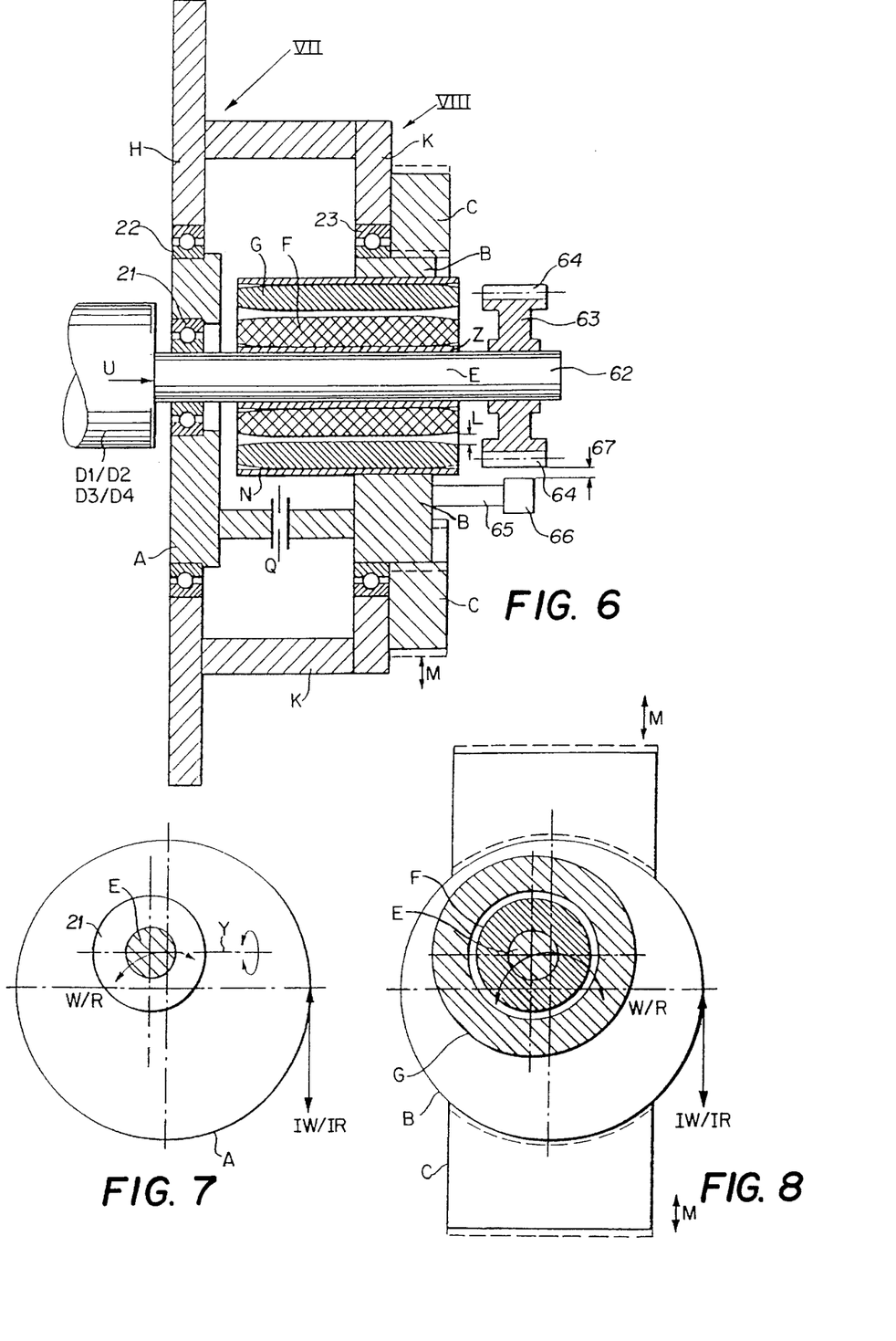
FIG. 6 shows an axial or longitudinal section view of the attachment of a hollow shaft sensor to the direct drive and the wall of the printing cylinder respectively.
FIG. 7 shows a front view according to arrow VII in FIG. 6.
FIG. 8 shows a front view according to arrow VIII in FIG. 6.

FIGS. 6–8 show the tracking feature with the eccentric bushings A, B for the rotor F,Z and/or the stator N,G of the electric motor for the plate or rubber cloth cylinders D1–D4. It allows adjustments for the cylinders D1–D4 in the axial direction U (adjustment of the side registration), crosswise direction R (adjustment of the diagonal registration), and set-up action W. The details of cylinder positioning can be found in the initially mentioned references DE-OS 41 38 479 and the earlier European patent application 93 106 545.2. The reference numerals of the attached FIGS. 6–8 match those used in FIGS. 7–9 of the referenced material.

In addition, the cylinder shaft E is provided with an axial extension 62 which protrudes co-axially from the electric motor G,F,N,Z and which is firmly and rigidly attached to the end face of the drive shaft and/or made of one piece. A pole or sensor pinion 63 of a hollow shaft sensor is rigidly and solidly attached to the peripheral surface of the extension 62. It carries, on the periphery, radial teeth 64 spaced at a certain pitch. A mounting shaft 65 that protrudes parallel to the axis is attached to the outer face of the eccentric bushing B that covers the stator G, N and that carries on its free end the pick-up transducer 66 of the hollow shaft encoder. It is positioned such that there is a gap 67 between the teeth 64 and the sensor pinion 63 relative to the sensor pinion axis. The gap is sized to allow functional interaction between the teeth 64 of the pinion 63 and the pick-up transducer and to allow axial adjustments up to a certain degree between the pick-up transducer 66 and the sensor pinion 63 without impacting the functional interaction between them. In addition, the pinion 63 and/or the teeth are designed wide enough for that purpose. Also, it is best for this purpose to center the transducer pick-up 66 over the teeth.

The invention is not restricted to the example of embodiment shown in FIGS. 6–8: it is conceivable that the mounting shaft 65 is directly attached to the frame H of the printing machine, and/or that the extension that holds the pinion 63 is mounted directly to the front of one of the cylinders D1–D4, while the electric motor F,G drives from the opposite end of the cylinders D1–D4 as indicated in FIG. 1.

What is claimed is:

1. An electrical drive system for angularly positioning a plurality of rotating equipment components in a printing machine, the electrical drive system comprising:

a plurality of electric motors each with a rotor designed for rigid and direct coupling to a respective component, including at least one angle encoder which registers an angular motion of the respective component, a signal processing module connected to the at least one angle encoder to receive actual angle position signals as input and designed to receive setpoint values and to compare the set point values with actual data, and a plurality of power amplifiers each controlled by the signal processing module and each connected to a respective electric motor for control thereof, wherein the signal processing module includes a plurality of controllers, each connected to a respective component and its respective power amplifier, that allows simultaneous input of setpoint data for the plurality of components, wherein the plurality of controllers are coupled to one another.

2. A drive system as claimed in claim 1, wherein the rotor is one of mechanically integrated with the component and designed as one piece with the component.

3. A drive system according to claim 1, wherein the electric motor is designed for attachment to a shaft end of the rotating component.

4. A drive system according to claim 1, wherein the electric motor is designed using one of a drum-shaped and a cylindrical external rotor wherein the rotor shape approximates a shape of the component, and especially in that the rotor can be incorporated into the component.

5. A drive system according to claim 1, wherein a single angle encoder is assigned to the electric motor and is attached to the component to directly register an angular motion of the component.

6. A drive system according to claim 1, wherein a single angle encoder is assigned to the electric motor and is attached to the rotor of the electric motor to directly register an angular motion of the rotor wherein at least one of the signal processing module and the angle encoder are connected to a monitoring module for monitoring component parameters as a differential feedforward signal.

7. A drive system according to claim 1, wherein at least two angle encoders are assigned to the electric motor and where one is attached to the rotor of the electric motor and one to the component to directly register angular motion of the rotor and the component wherein signal outputs of the two encoders are connected to the signal processing module as a differential feedforward signal.

8. A drive system according to claim 1, wherein the angle encoder is designed as one of a sine/cosine absolute encoder, an incremental encoder with square wave signal and marker pulse, an incremental encoder with sine/cosine signal and marker pulse, and a hollow shaft encoder with scanning head and pinion with angle graduation.

9. A drive system as claimed in claim 8, wherein the pinion is one of mechanically integrated with the component and designed as one piece with the component.

10. A drive system as claimed in claim 8, wherein the design allows axial shifting of the scanning head and the pinion relative to each other along art axis of the component.

11. A drive system according to claim 8, wherein the scanning head is one of attached to and supported by a stationary part of the electric motor.

12. A drive system according to claim 1, further comprising a power amplifier that includes a voltage system converter with at least one of an intermediate voltage circuit and a direct feed.

13. A drive system according to claim 12, wherein the power amplifier is designed with digital phase current control with pulse width modulation and high clock frequency, fast transistorized switches, anticipatory voltage controls, and at least one of phase current setpoint data and anticipatory data input via fiber optic lines.

14. A drive system according to claim 1, wherein the signal processing module is designed to include a digital signal processor that handles at least one of encoder data analysis, motor control, speed control, angle position control, and fine interpolation of at least one of the setpoint values and anticipatory data.

15. A drive system according to claim 1, wherein the plurality of controllers are coupled to one another by additional weighted feedbacks.

16. A drive system according to claim 1, wherein each controller has inputs for the actual data to allow disturbance variable feed forward.

* * * * *